(12) United States Patent
Porterat

(10) Patent No.: US 8,097,233 B2  
(45) Date of Patent: Jan. 17, 2012

(54) SYNTHESIS OF NANOPARTICLES BY LASER PYROLYSIS

(75) Inventor: Dominique Porterat, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 73 days.

(21) Appl. No.: 12/525,644

(22) PCT Filed: Jan. 22, 2008

(86) PCT No.: PCT/EP2008/050728
§ 371 (c)(1),
(2), (4) Date: Aug. 3, 2009

(87) PCT Pub. No.: WO2008/095774
PCT Pub. Date: Aug. 14, 2008

(65) Prior Publication Data
US 2010/0092367 A1    Apr. 15, 2010

(30) Foreign Application Priority Data
Feb. 2, 2007  (FR) ...................... 07 00750

(51) Int. Cl.
*C01G 23/04* (2006.01)
(52) U.S. Cl. .............. 423/592.1; 423/610; 423/417; 423/608; 977/773; 204/157.41
(58) Field of Classification Search .............. 423/417, 423/610, 611, 608, 592.1; 977/773; 204/157.15, 204/157.41, 186
See application file for complete search history.

(56) References Cited

U.S. PATENT DOCUMENTS

| | | | |
|---|---|---|---|
| 4,548,798 A | 10/1985 | Rice | |
| 6,193,936 B1 | 2/2001 | Gardner et al. | |
| 6,225,007 B1 * | 5/2001 | Horne et al. | ............... 429/231.5 |
| 6,387,531 B1 | 5/2002 | Bi et al. | |
| 7,101,520 B2 * | 9/2006 | Kumar | .................... 423/263 |

FOREIGN PATENT DOCUMENTS
EP    1122212    6/2003

OTHER PUBLICATIONS

Cauchetier M., et al, "Nanocomposite Si/C/N powder production by laser-aerosol interaction", M. Cauchetier, O. Croix, N. Herlin, M. Luce, J. American Ceramic Society 77(4), p. 993-8 (1994).

Marino E., "Nanoparticules de carbone par pyrolyse laser: Etude de l'incorporation d'hétéoatomes", E. Marino, thesis, Université de Paris XI, Orsay (Dec. 8, 2004)—p. 33.

(Continued)

*Primary Examiner* — Steven Bos  
*Assistant Examiner* — Richard M Rump  
(74) *Attorney, Agent, or Firm* — Miller, Matthias & Hull LLP

(57) ABSTRACT

The present invention relates to the synthesis of nanoparticles by laser hydrolysis. For this purpose, a precursor interacts with a laser beam (LAS) in a pyrolysis reactor (REAC) for producing nanoparticles (nP), characterized in that the precursor is firstly in the liquid state and is then converted into the vapor phase and in that the flow rate of the precursor is controlled in the liquid phase.

12 Claims, 4 Drawing Sheets

OTHER PUBLICATIONS

Grujić-Broćin M., et al., "Infared study of laser synthesized anatase TiO$_2$ nanopowders" Journal of Phsics D. Applied Physics, Institute of Physics Publishing, Bristol, GB, vol. 38, No. 9, May 7, 2005, pp. 1415-1420, XP020083673—ISSN: 0022-3727.

Miguel O B, et al., "Magnetic Nanoparticles Prepared by Laser Pyrolysis", Sep. 2002, IEEE Transactions on Magnetics, IEEE Service Center, New York, NY, US, pp. 2616-2618—XP001131644—ISSN: 0957-4484.

Alexandrescu R, et al., "TiO$_2$ nanosized powders by TiCl$_4$ laser pyrolysis", May 1, 2004, Nanotechnology, IOP, Bristol, GB, pp. 537-545, XP020067938—ISSN: 0957-4484.

Kammler H., et al., "Carbon coated titania nanostructured particles, Continuous, one step flame synthesis", H. Kammler, S. Pratsinis, Journal of Material Research vol. 18 No. 11, 2003, p. 2670, XP002446114.

International Search Report for related international application No. PCT/EP2008/050728, report dated Apr. 18, 2008.

* cited by examiner

SYNTHESIS OF NANOPARTICLES BY LASER PYROLYSIS

CROSS-REFERENCE TO RELATED APPLICATIONS

This application is a U.S. national stage filing of International Patent Application No. PCT/EP2008/050728 filed on Jan. 22, 2008, which claims priority under the Paris Convention to French Patent Application No. 07 00750, filed on Feb. 2, 2007.

FIELD OF THE DISCLOSURE

1. Technical Field

The present invention relates to the production of nanoparticles by laser pyrolysis.

2. Background of the Disclosure

Nanostructured materials have undergone very strong development in the last ten years. This development is associated with the properties of these materials, which have opened up new fields of application in areas as varied as optics and catalysis.

The grain size of the nanostructured materials may extend from a few nanometers to a few tens of nanometers, and may be selected according to the desired property for a given application. For example, thermomechanical ceramics have demonstrated plasticity at high temperature, while these materials normally have mechanically brittle behavior. This property is associated with a grain sliding effect and is observed in particular when the nanostructuring occurs at a scale of a few tens of nanometers. On the other hand, effects due to quantum confinement are observed for particles having a size of a few nanometers.

To obtain nanomaterials, an approach called the "bottom-up" approach consists in organizing all the nanosized particles, which implies having nanoparticles in a quantity compatible with the intended application. Furthermore, nanostructures having the desired properties must be obtained reproducibly, and preferably have good physical uniformity (shape and size of the nanograins, crystallinity) and chemical uniformity (composition).

Among the techniques for synthesizing nanoparticles, combustion (also called flame synthesis) and laser pyrolysis are flow techniques, which constitutes an important criterion for industrial development. Moreover, the application of this type of technique substantially meets the abovementioned reproducibility requirements. Combustion is already used on the industrial scale, for example for producing nanoparticles of titanium dioxide ($TiO_2$).

Laser pyrolysis also appears to be a good candidate technique for industrial production for supplying the growing need for nanoparticles.

This technique is based on the excitation of a compound which absorbs the energy of a laser radiation and transmits this energy to a reaction medium, of which the temperature rises very rapidly. The reactants raised to high temperature decompose. After dissociation of these compounds, which are referred to as precursors, nanoparticles are formed and then undergo a quench (sudden cooling) effect upon leaving the flame. This sudden drop in temperature has the effect of stopping the growth of the particles. Nanosized particles are thereby obtained. The various adjustable parameters (flow rates, pressures and types of precursor, laser power) finally serve to obtain nanopowders with good physical and chemical uniformity, and also various products with a wide range of chemical composition, size and crystallinity.

Concerning the combustion technique, it is possible to use precursors initially in liquid form. They are then conveyed to a pyrolysis reactor in vapor form, using an evaporator.

In the case of the laser pyrolysis technique, the prior art involves the use of precursors in liquid form (more precisely in aerosol form).

Precise references to the prior art are given below.

The document "*Carbon coated titania nanostructured particles: Continuous, one step flame synthesis*", H. Kammler, S. Pratsinis, J. Mater. Res. 18(11), p. 2670 (2003), proposes a combustion system which uses a precursor in liquid form. This system is based on the use of a mass flow controller (RDM) for controlling the liquid flow rate, the controller being followed by an evaporator which converts the liquid to the vapor phase. This vapor is then transferred to a combustion reactor via a line of which the temperature is regulated at 145° C.

The combustion system has been used to synthesize $TiO_2$ nanoparticles from titanium tetraisopropoxide (TTIP). In this document, the TTIP flow rate is not indicated but particle production is between 5 and 8 grams per hour. The particles always contain carbon (0.5 to 50 wt %) and the specific surface area extends in a range from 29 to 62 $m^2$ per gram.

However, as a technique based on combustion, only metal oxide powders can be obtained from metal precursors. Thus the main limit of this synthesis technique stems from the chemical mechanisms involved, and necessarily leading to the production of oxide nanoparticles.

Laser pyrolysis has been applied to yield satisfactory results for preparing a wide variety of powders, both of non-oxide materials (for example Si, C, SiC, $Si_3N_4$, Si/C/N, fullerenes) and oxides (for example compounds such as Ti/C/O, Si/C/O, Si/Ti/C/O).

The document "*Nanocomposite Si/C/N powder production by laser-aerosol interaction*", M. Cauchetier, O. Croix, N. Herlin, M. Luce, J. American Ceramic Society 77(4), p. 993-8 (1994), describes the use of several liquid precursors for synthesizing oxide (or non-oxide) particles, using a "Pyrosol" type aerosol generator.

This document describes an apparatus for generating an aerosol of precursor droplets. The micron-sized droplets are then conveyed by a gas stream to a reactor, where they interact with the laser beam. The absorption of the energy from the laser beam causes the evaporation of the droplets, followed by the decomposition of the precursors and the growth of nanoparticles with the appearance of an incandescent flame. This apparatus served, for example, for producing nanoparticles having the composition SiCN, TiCO and others, with a production rate of about ten to twenty grams per hour for a liquid entrainment of up to some fifty grams per hour. However, the particles obtained by this type of method frequently have a non-uniform size distribution (often bimodal, with large grains next to small grains).

Other aerosol systems which can be coupled with laser pyrolysis are described in document U.S. Pat. No. 6,193,936, which describes the use of a piezoelectric transducer for generating an aerosol. The document also describes various ways to convey the aerosol to a laser pyrolysis reactor, and also reactant feed devices and various solutions for optimizing the coverage between the laser beam and the aerosol.

A system for producing carbon nanoparticles, in which the precursor droplets pass through an evaporator, is described in "Nanoparticules de carbone par pyrolyse laser: Etude de l'incorporation d'hétéroatomes", E. Marino, thesis, Université de Paris XI, Orsay (8 Dec. 2004).

The liquid precursor feed is provided by an injector like those known in the automotive field, hence in pulsed mode, which is detrimental to the production of a uniform flame, and hence for obtaining uniform nanostructured compounds.

In the case of the synthesis of carbon powders with the addition of iron, according to the Marino document, it is necessary to use a gaseous carbon-containing sensitizer (butadiene), in addition to the liquid precursor (mixture of toluene and ferrocene). The injector frequency is 1 to 3 Hz with an injection valve opening time of 0.75 ms. The mass yield, defined as the mass of carbon/iron particles collected in comparison to the weight of the carbon/iron injected (butadiene, toluene and ferrocene vapors) is about 60%. These carbon-containing powders have a heterogeneous morphology, with spherules having diameters between 40 and 80 mm, and also filamentary zones. The ratio of the presence of these two morphologies varies according to the experimental conditions.

It therefore appears that for producing nanoparticles continuously and at satisfactory rates and yields (typically above 10 grams per hour and a yield of 70%), the prior art of laser pyrolysis has so far proposed, as the best solution, the use of aerosols containing precursors in droplet form.

However, in this type of technique using a pyrosol (in particular according to the abovementioned Cauchetier et al document), in addition to the non-uniformity of the nanoparticles obtained, particularly in terms of size, several drawbacks are encountered. The evaporation of the droplets generates high energy losses during the interaction with the laser beam. Moreover, this type of system, which is suitable for forming droplets, is unsuitable with excessively viscous precursors. Finally, the quantity of solution entrained, typically about 25 to 50 grams per hour, is too limited and already requires a carrier gas flow rate (generally carrier argon) of about two liters per minute. To increase the liquid entrainment, the carrier gas flow rate must be further increased, and this is liable to cause turbulence that is detrimental to the quality of the products obtained.

SUMMARY OF THE DISCLOSURE

The present invention improves the situation.

For this purpose, it proposes a method for synthesizing nanoparticles by laser pyrolysis, in which at least one precursor interacts, in the vapor phase, with a laser beam in a pyrolysis reactor to produce nanoparticles. In particular, the precursor is:

first in the liquid phase,
then, converted to the vapor phase in an evaporator, before injection into the reactor.

Advantageously, the liquid phase precursor flow rate is controlled for continuous injection into the reactor.

Thus, the precursor flow is substantially continuous and controlled, for example by a mass flow controller, so that the flow rate of precursor is finely controlled in the liquid phase by the abovementioned mass flow controller.

Obviously, in the rest of the description, the terms "vapor phase" and "gas phase" both mean the same element, that is a gas. Thus, when it is stated above that the precursor is injected into the reactor in the "vapor phase", it must be understood that the precursor is injected in gas form. It is emphasized in particular that the expression "vapor phase" is not at all intended here to designate a suspension of droplets in a gas.

The vapor phase precursor may be conveyed by a gas into the reactor. This gas may be an inert gas, but it may also comprise a sensitizer, if necessary, to transfer energy to the precursor in the pyrolysis. The carrier gas may also be an additive combining with the precursor to form the nanoparticles.

According to an advantage procured by the present invention, the flow rate of precursor (in liquid form) for the laser pyrolysis reaction may be up to 1000 grams per hour.

As will be shown below in the results obtained by the implementation of the invention, the flow rate of precursor in liquid form is about 100 grams per hour, for a precursor of the titanium tetraisopropoxide (TTIP) type, the pyrolysis produces more than 20 grams of TiCO nanoparticles per hour, and, in particular more than 25 grams per hour.

On completion of this procedure, to obtain $TiO_2$ particles, it may be advisable to carry out an annealing at low temperature, typically between 200 and 400° C., in ambient atmosphere, until the carbon disappears. It is also stated that for an annealing temperature above 400° C., the structure of the particles may be modified.

The present invention also relates to a device for synthesizing nanoparticles by laser pyrolysis, comprising:
a pyrolysis reactor,
means for generating a laser beam for interacting with a precursor, in said pyrolysis reactor.

In particular, the precursor initially being in the liquid phase, the synthesis device further comprises:
an evaporator for injecting the vapor phase precursor into the pyrolysis reactor, and
a flow controller of the liquid phase precursor for injecting the precursor continuously into the reactor.

Thus, the present invention proposes a substantially continuous precursor injection into the reactor, finely controlled in the precursor liquid phase, for an application in laser pyrolysis.

The results obtained are superior by far to:
those obtained by the combustion technique, on the one hand (in particular because of the possible production of non-oxide powders, but also because of the good grain size dispersion obtained),
and those of the conventional laser pyrolysis technique (with droplet injection), on the other hand, as shown below with reference to FIGS. 4a, 4b and 5a to 5d.

It should already be clear that the physicochemical mechanisms involved in laser pyrolysis, on the one hand, and in combustion (necessarily with oxidation) on the other hand, are different.

It should also be clear that the mechanisms involved in laser pyrolysis by vapor phase injection in the context of the invention, on the one hand, and in laser pyrolysis by liquid phase injection in the form of droplets, on the other hand, are also different. This is because in the latter technique, the laser beam must necessarily supply additional energy to evaporate the droplets before the actual pyrolysis reaction.

It also appears that the independent control of the carrier gas flow rate and the precursor flow rate by conversion of the precursor to the gas phase before contact with the carrier gas, procures advantageous effects in the pyrolysis carried out.

At all events, the advantages observed over prior art techniques are in particular:
flexibility of use,
adjustable control of nanoparticle size and production yield as described below with reference to Table 1 below,
narrower standard deviation of the nanoparticle size obtained, also described below and,
high hourly yield.

It effectively appears that the application of the invention serves to obtain a very narrow grain size dispersion, in fact, the lowest of the prior art obtained by laser pyrolysis and combustion. An object of the present invention is the product obtained by the inventive method, comprising nanoparticles synthesized by laser pyrolysis, the size dispersion of the nanoparticles being lower than 40% and preferably close to 35%. In the context of the present invention, "dispersion" means the standard deviation with regard to a mean size on 200 grains.

BRIEF DESCRIPTION OF THE DRAWINGS

Other advantages and features of the invention will appear from a reading of the detailed description of the exemplary embodiment provided below, in conjunction with the appended graphs in which.

EXEMPLARY EMBODIMENTS

Figure 1:
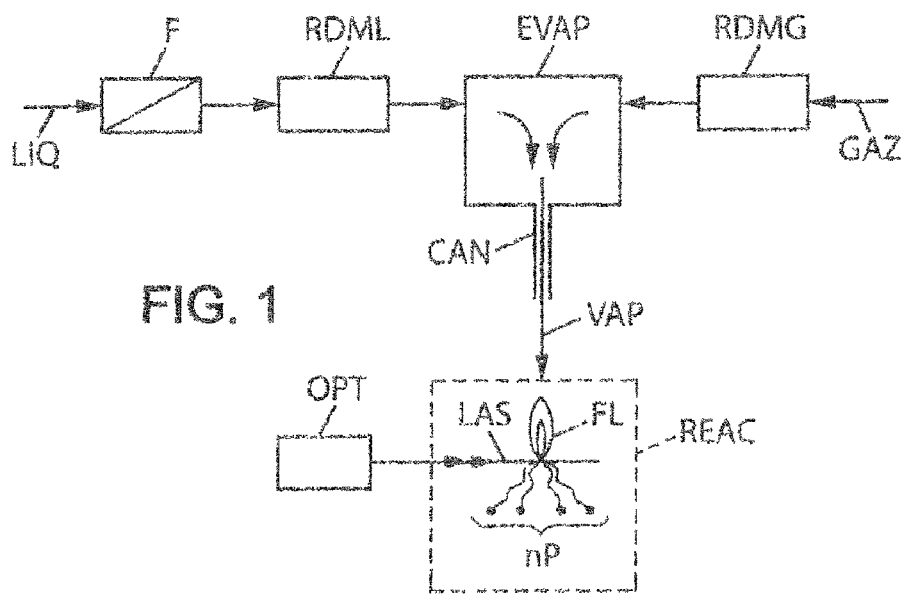
FIG. 1 schematically shows a device according to an embodiment of the invention.

An exemplary embodiment of the invention is shown in FIG. 1.

The precursor, first in liquid form LIQ, is filtered by filter F. Its flow rate is then controlled by a mass flow controller RDML, which is followed by an evaporator EVAP, which then converts the precursor to the vapor phase VAP before interaction with the laser beam LAS.

Thus, it is proposed to couple a laser pyrolysis device with a mass flow controller RDML to control the precursor flow rate in liquid form LIQ, before converting it to the vapor phase VAP for injection into the pyrolysis reactor REAC.

The vapor VAP is entrained by a gas stream (preferably by an inert gas in the pyrolysis reaction, such as a rare gas, for example argon). This gas stream GAZ is also managed by a gas mass flow controller RDMG. The mixture of vapor and gas (referenced VAP) leaving the evaporator-mixer EVAP is finally conveyed to the laser pyrolysis reactor REAC via a line CAN of which the temperature is set so as to prevent the condensation of the precursor.

The laser beam LAS issues from a laser source OPT, optionally through one or more collimators not shown, in order to interact effectively with the vapor flow VAP in the reactor REAC, by creating a flame FL and, thereby, nanoparticles referenced nP in FIG. 1.

Advantageously, the liquid flow rate and the gas flow rate are set independently and the liquid flow rate may be regulated up to 1 kg per hour.

It is indicated that assemblies of the type shown in FIG. 1 are already used in combustion pyrolysis. Liquid and/or gas mass flow controllers are available on the market (from Bronkhorst® for example).

However, for managing hydrolysable precursors (which react with air, such as TTIP) and are hence liable to clog the evaporator EVAP or the lines of the device (in particular the line CAN), it is important to provide a circuit for circulating a solvent for cleaning their lines of the device, and in particular the evaporator EVAP.

Figure 2:
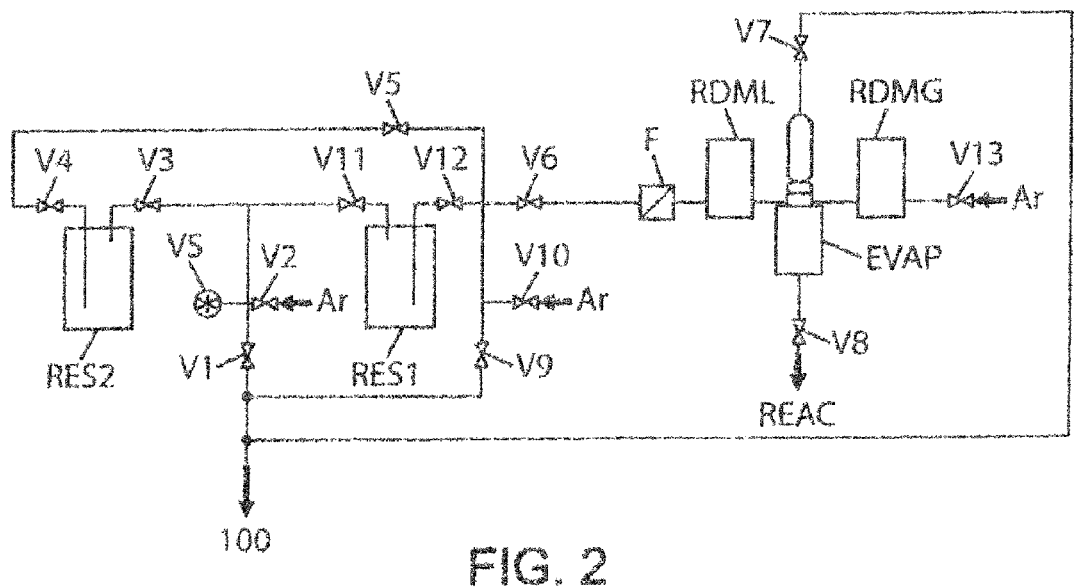
FIG. 2 is a flowchart of a system for rinsing the lines of the device in FIG. 1, in a particular embodiment which is advantageous when the precursor is liable to clog the lines.

One example of a system for feeding precursor and for rinsing the lines by such a solvent is shown in FIG. 2.

It comprises a first tank RES1 containing the precursor and a second tank RES2 containing the rinse liquid for cleaning the lines and in particular the interior of the evaporator-mixer. The system is equipped with valves V1 to V13 for isolating the lines and for filling, precursor feed, followed by drainage and cleaning. Reference numeral 100 denotes vacuum. Reference Ar (for "argon") denotes the inert gas injection. The other references in FIG. 2, common to those in FIG. 1, denote the same elements.

An example of the use of the device according to the invention is given below, as shown in FIG. 2.

A first step a) consists of its filling. The following operations are then performed:
a1) creation of a vacuum in the various lines (by starting a pump, closing the valves V2, V3, V4, V11, V12, V10 and opening the valves V1, V7, V9, V5, V6, V8, the system being connected to the reactor REAC),
a2) draining the lines of the tanks RES1 and RES2 (by closing the valve V1, opening the valve V2 for a few seconds only, and then by again opening the valve V1),
a3) filling the inert gas tanks (by opening the valves V3 and V11 and closing the valve V1, then slowly opening the valve V2 and closing the valve V11),
a4) filling the system with the cleaning solvent (by closing the valves V7 and V9, opening the valve V13, then the valve V4 until the controller RDML at least is filled with solvent, then carefully opening the valve V7, and then closing the valves V3, V4 and V5), and
a5) draining the evaporator EVAP (by opening the valves V7 and V9, then the valve V10 and then repeating this operation).

A second step b) of use of the device according to the invention relates to the precursor feed to the reactor REAC and comprises the following operations:
b1) sending the inert gas into the reactor (by opening the valve V8),
b2) sending the precursor to the reactor (by opening the valves V11 and V12, and gradually increasing the quantity of precursor sent),
b3) activating the laser source.

A third step c) relates to the stopping of the pyrolysis and the drainage of precursor. It comprises the following operations:
c1) applying the cleaning solvent (by closing the valves V11 and V12, the flame FL being progressively extinguished because no further product passes through the evaporator, then opening the valves V7 and V9, opening the valve V10 and then progressively closing the valves V9 and V7, then closing the valve V10 and then opening the valves V3, V4, V5),
c2) purging the evaporator with the cleaning solvent (waiting for a few minutes for the solvent to clean the evaporator, then closing the valves V2, V3, V4 and V5 and applying evaporator drainage operation a5)), c3) introducing the inert gas into the evaporator (by opening the valve V8 and allowing a constant flow of inert gas into the evaporator, then closing the valves V7 and V9 and finally opening the valve V10).

Figure 5A:
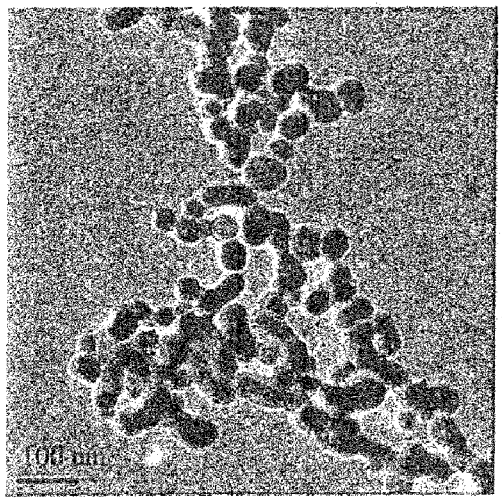
FIGS. 5a to 5d are microscope photographs of nanograins obtained:
 by laser pyrolysis according to the invention, with various vapor phase precursor flow rates (FIGS. 5a to 5c), and
 by laser pyrolysis according to the prior art, with formation of droplets in a reactor (FIG. 5d)
Figure 5B:
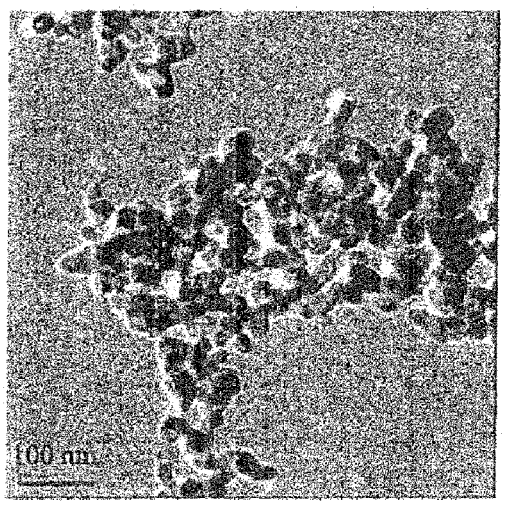
Figure 5C:
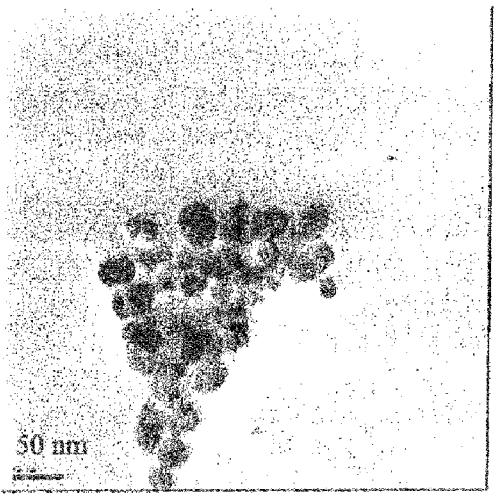

Carrying out these steps serves in particular to obtain any type of powder (oxide or non-oxide), with satisfactory properties of the nanosized grains obtained, as shown by reference to FIGS. 5a to 5c.

More particularly, the device according to the invention serves to obtain, with well controlled liquid precursor flow rates, all the nanoparticles already obtained by laser pyrolysis, having compositions such as SiCN, SiCO, TiCO, TiON, ZrCO, AlO or others, and by using the same precursors (for example the family of silazanes, siloxanes, TTIP, zirconium butoxide), or even other more viscous precursors.

By coupling with the RDMG gas method, it is possible:
to improve the reaction yield by adding a sensitizer (ethylene, ammonia, silane),
and/or add other chemical elements to the nanoparticles obtained (nitrogen N atoms, metal atoms, or others).

Figure 3:
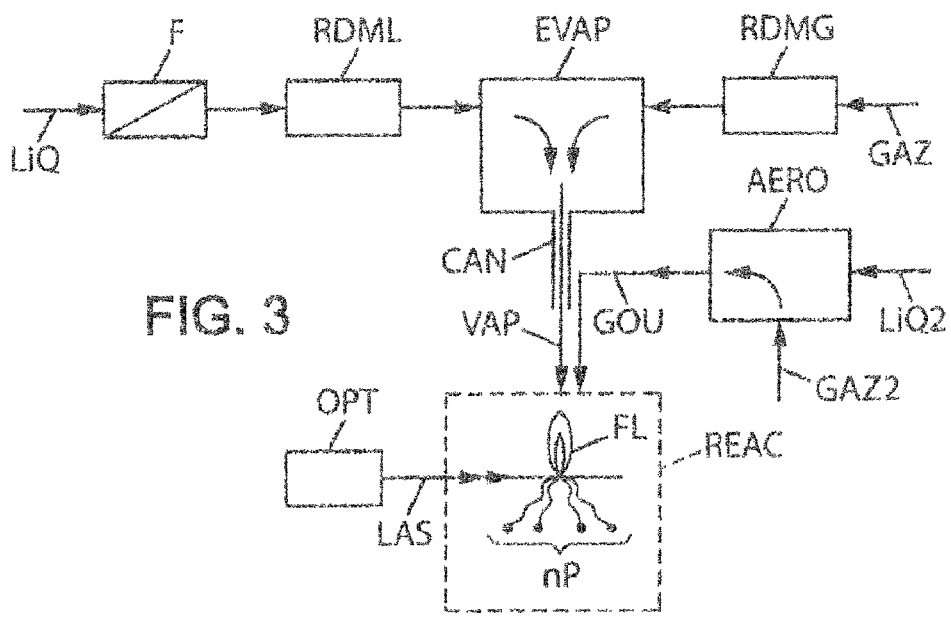
FIG. 3 shows an installation for a mixed laser pyrolysis technique by injection of vapor and liquid droplets into the reaction chamber.

Now with reference to FIG. 3, the device according to the invention (of the type shown in FIG. 1) is advantageously coupled with an injector for a liquid phase precursor such as the aerosol AERO in FIG. 3 (for example a device of the pyrosol type of the prior art in laser pyrolysis).

In FIG. 3, the references common to FIG. 1 denote the same elements.

This installation in FIG. 3 serves to obtain powders having more complex compositions (for example metal-doped TiCO, or SiCN doped by sintering additives).

It should be recalled that an aerosol AERO, of the pyrosol type, receives a precursor in liquid form LIQ2 and comprises an injection of inert gas GAZ2 to produce precursor droplets GOU, for injection into the reactor REAC. In the device shown in FIG. 3, the vapor phase VAP of a first precursor in injected into the reactor REAC with the droplets GOU of a second precursor. Advantageously, this second precursor may be different from the first precursor. These two precursors could even be incompatible if they were injected together by the same means (by pyrosol alone or by evaporator alone). In the context of the present invention, "incompatible" means precursors capable of reacting together (upstream of the reactor), such as ammonia and diborane, for example.

Results Obtained

As a purely illustrative example, the results described below were obtained in the synthesis of TiCO nanoparticles from a TTIP type hydrolysable precursor. The precursor tank is filled under inert gas atmosphere, such as argon (in glove box). The liquid flowmeter used can deliver 0 to 100 grams of TTIP per hour.

Many synthesis quality parameters were checked, such as the stability of the pyrolysis system, the production efficiency, the reproducibility and narrow dispersion of the nanoparticle size obtained.

Stability

Figure 6:
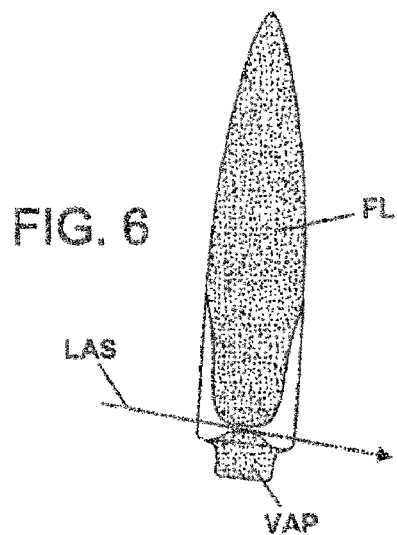
FIG. 6 shows the stability of the laser pyrolysis flame according to the invention.

One of the most significant quality tests concerns the stability of the laser pyrolysis reaction by observation of the flame. With reference to FIG. 6, which corresponds to a photograph taken of the flame in the reactor, it appears that the flame FL is remarkably stable and quite sharp (no blur). No "pulsation" or "flashing" was observed. FIG. 6 also shows the presence of a hotter zone at the base of the flame, which is crossed by the laser beam LAS, and the precursor inlet flow VAP.

Figure 4A:
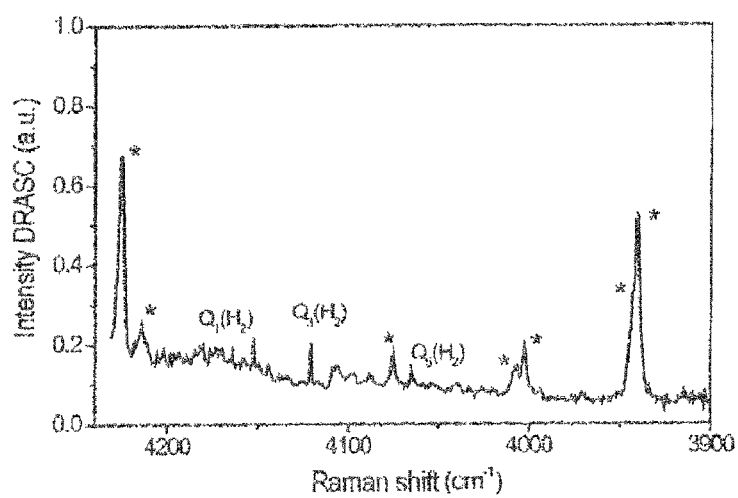
FIGS. 4a and 4b show Raman spectroscopy measurements (Raman shift ($cm^{-1}$) on the x-axis-intensity (arbitrary use) on the y-axis) on:
 a laser pyrolysis flame supplied by a gas phase precursor according to the invention, and
 a laser pyrolysis flame supplied by a liquid phase precursor, in the form of droplets, according to the prior art.
Figure 4B:
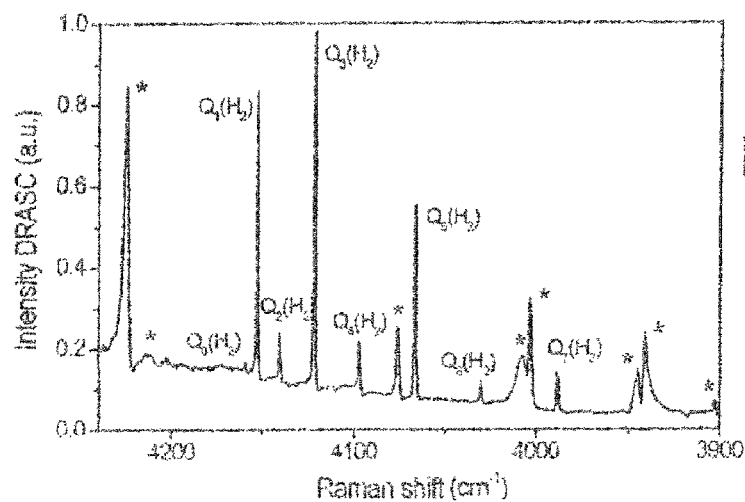

Another test serves to illustrate the stability of the laser pyrolysis according to the invention, compared to that of laser pyrolysis using pyrosol. This concerns Raman spectroscopy measurements taken on a pyrolysis flame. FIG. 4a shows the signal-to-noise ratio in Raman spectroscopy, obtained with the pyrosol according to the prior art, and FIG. 4b shows the signal-to-noise ratio in Raman spectroscopy, obtained with the device comprising the evaporator according to the invention. It may be observed that the peaks are clearly more pronounced in FIG. 5b (see in particular the $Q_3(H_2)$ peak). This difference confirms that the laser pyrolysis flame according to the invention is more stable.

Production Efficiency

Using 100 grams of a TTIP type precursor, it is theoretically only possible to obtain a maximum of 28 grams per hour of $TiO_2$ powder. In fact, with a flow rate of 100 g per hour, a batch of 22 grams of TiCO nanoparticles was obtained in 50 minutes of laser pyrolysis according to the invention, corresponding to an efficiency and a record yield of 26.4 grams per hour of TiCO powder obtained.

Reproducibility

The appearance of the nanostructures obtained by the method according to the invention is perfectly reproducible from one pyrolysis to another. Typically, in the same pyrolysis conditions (in particular in terms of precursor flow rate), the specific surface area measured on three TiCO powders obtained after three different pyrolyses, was respectively 56, 55 and 56 $m^2$ per gram, for particle diameters of 27.5, 28 and 27.5 nanometers, thereby illustrating the reproducibility of the synthesis according to the invention. These diameters were estimated by the BET (Brunauer, Emmett and Teller) method with a density arbitrarily set at 3.9.

Narrow Grain Size Dispersion

Figure 7A:
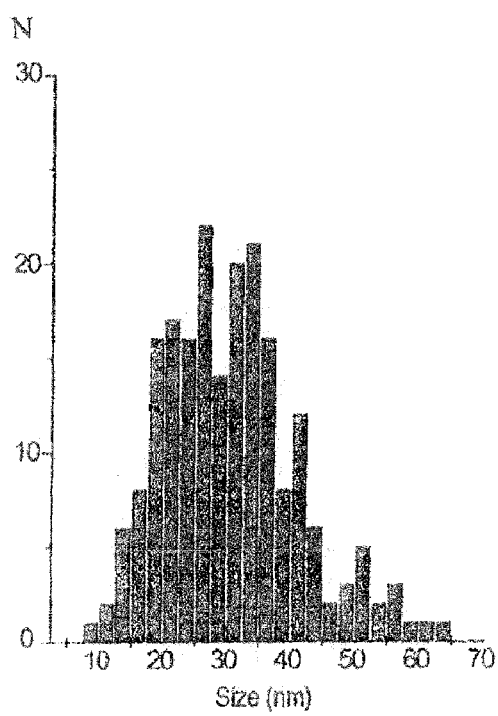
FIGS. 7a and 7b show a count of the nanoparticle sizes obtained from the examples illustrated in the respective FIGS. 5a and 5b.
Figure 7B:
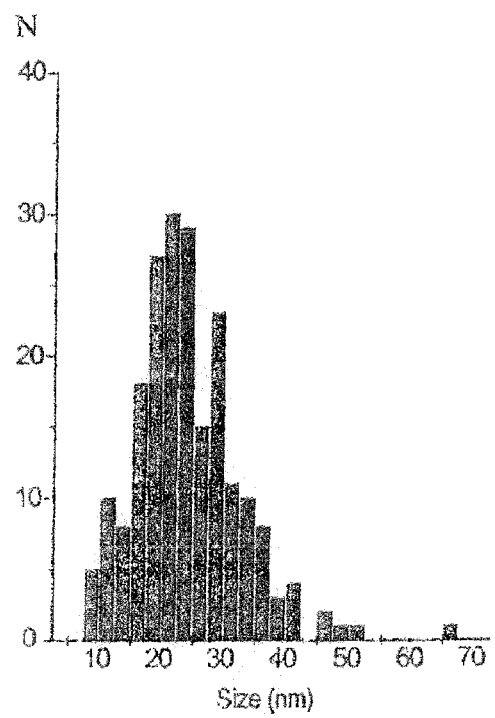

With reference to FIGS. 5a to 5c, even in different precursor flow rate conditions, a uniform morphology can be observed in the powders obtained by the method according to the invention. A very narrow grain size distribution can be observed in FIGS. 7a and 7b, which show histograms of particle size measurements, for a population of 200 particles, with regard to FIGS. 5a and 5b respectively. In FIG. 7a, the mean grain size is 30.4 nm, for a standard deviation $\sigma=10.6$ nm. In FIG. 7b, the mean grain size is 24.1 nm, for a standard deviation $\sigma=8.6$ nm.

Thus typically, the grain size dispersion obtained by the implementation of the invention is lower than 40%. It is also about 35% in FIGS. 5a to 5c. In the context of the present invention, "dispersion" means the standard deviation with regard to a mean size on 200 grains.

Figure 5D:
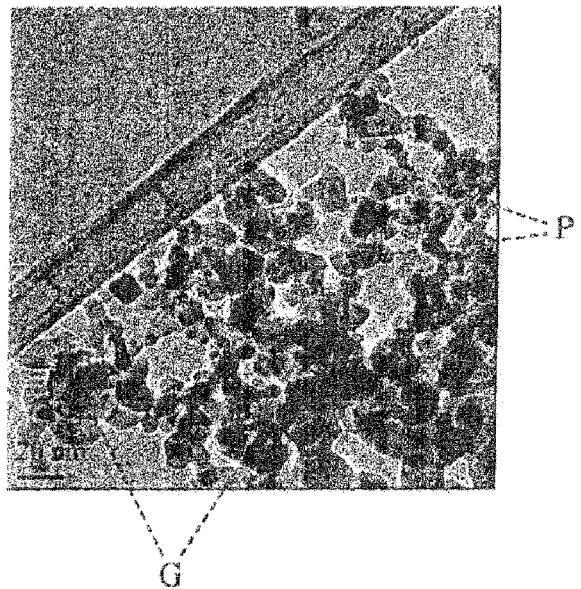

On the other hand, in FIG. 5d, the very different grain sizes obtained by the pyrosol device of the prior art are clearly observed, with in particular, a substantially bimodal, characteristic distribution (two distinct grain sizes G and P in FIG. 5d).

It is important to indicate further that the technique of nanoparticle synthesis by combustion generally yields even poorer results, in terms of dispersion, than the synthesis by laser pyrolysis. In consequence, the narrow dispersion obtained by the implementation of the method according to the invention is the narrowest obtained at least for these two laser pyrolysis and combustion techniques.

The table below also shows the effect (in terms of specific surface area) of the dilution of the TTIP precursor (flow rate 100 grams per hour) in an inert carrier gas stream (argon) with a variable flow rate.

TABLE 1

| Example | Laser power (W) | Laser power absorbed by precursors (W) | Carrier gas flow rate (liters per minute) | Specific surface area (m² per gram) |
| --- | --- | --- | --- | --- |
| #1 | 2415 | 90 | 0.5 | 32 |
| #2 | 2430 | 85 | 1 | 41 |
| #3 | 2420 | 80 | 1.5 | 57 |
| #4 | 2420 | 70 | 2 | 76 |

RESULTS OF PRIOR ART TECHNIQUES AND COMPARISONS

The following have been identified as prior art documents:
D1: GRUJIC-BROJCIN M ET AL: "*Infrared study of laser synthesized anatase TiO$_2$ nanopowders*" JOURNAL OF PHYSICS D. APPLIED PHYSICS, INSTITUTE OF PHYSICS PUBLISHING, BRISTOL, GB, vol. 38, No. 9-7 May 2005, pages 1415-1420;
D2: U.S. Pat. No. 6,387,531;
D3: U.S. Pat. No. 4,548,798;
D4: MIGUEL O B ET AL: "*MAGNETIC NANOPARTICLES PREPARED BY LASER PYROLYSIS*", September 2002, IEEE TRANSACTIONS ON MAGNETICS, IEEE SERVICE CENTER, NEW YORK, N.Y., US, pages 2616-2618;
D5: ALEXANDRESCU R ET AL: "*TiO$_2$ nanosized powders by TiCl$_4$ laser pyrolysis*", 1 May 2004, NANOTECHNOLOGY, IOP, BRISTOL, GB, pages 537-545.

None of these documents discloses a continuous control of the liquid phase flow rate of the precursor, nor an independent control of the flow rate of carrier gas.

In document D1, according to FIG. 2(*b*) of this document, the mean grain size is 37 nm and the standard deviation is 11 nm. With reference to FIG. 2(*c*), the mean value is 41 nm and the standard deviation is 12 nm. In FIG. 2(*d*), the mean value is 45 nm for a standard deviation of 17 nm. The results obtained by the implementation of the invention, described above with reference to FIGS. 7*a* and 7*b*, are better.

In document D2, according to FIG. 13 of this document (histogram), the mean grain size is 19 nm, for a standard deviation of 6 nm. The grains obtained by the implementation of the invention are more uniform. Furthermore, document D2 does not provide any indication of hourly yield.

The invention claimed is:

1. A method for synthesizing nanoparticles by laser pyrolysis, in which at least one precursor interacts, in the vapor phase, with a laser beam in a pyrolysis reactor to produce nanoparticles,
   wherein the precursor is:
   first in the liquid phase,
   then, converted to the vapor phase in an evaporator, before injection into the reactor,
   and wherein a flow rate of the precursor in the liquid phase is controlled for continuous injection into the reactor,
   wherein the precursor in the liquid phase has a flow rate that is substantially continuous and controlled by a mass flow controller.

2. The method as claimed in claim 1 wherein the vapor phase precursor is conveyed by a carrier gas into the reactor.

3. The method as claimed in claim 2, wherein the carrier gas is an inert gas in the pyrolysis.

4. The method as claimed in claim 2, wherein the carrier gas comprises an additive acting as a sensitizer in the pyrolysis.

5. The method as claimed in claim 2 wherein the carrier gas comprises an additive which combines with the precursor to form the nanoparticles.

6. The method as claimed in claim 2 wherein the flow rate of carrier gas is controlled by a mass flow controller.

7. The method a claimed in claim 6, wherein the flow rate of precursor, on the one hand, and the flow rate of inert gas, on the other hand, are managed separately.

8. The method as claimed in claim 6, wherein the carrier gas is inert in the pyrolysis and the evaporator mixes the precursor, in the vapor phase, with the inert gas.

9. The method as claimed in claim 1, wherein a further injection of precursor is provided into the pyrolysis reactor, in the form of liquid droplets.

10. The method as claimed in claim 1, wherein a circulation of a solvent is provided for cleaning at least said evaporator.

11. The method as claimed in claim 1, wherein the flow rate of the precursor in liquid form ranges from about 100 grams per hour to about 1000 grams per hour.

12. The method as claimed in claim 11, wherein the flow rate of precursor in liquid form is about 100 grams per hour, for a precursor of the titanium tetraisopropoxide type, and in that the pyrolysis produces more than 20 grams of TiO$_2$ nanoparticles per hour.

* * * * *